United States Patent
Bielby

[15] 3,704,471
[45] Dec. 5, 1972

[54] BEEHIVES
[72] Inventor: William B. Bielby, Flat 3, 74 Cornwall Road, Harrogate, Yorkshire, England
[22] Filed: Jan. 23, 1970
[21] Appl. No.: 5,201

[52] U.S. Cl. .........................................6/2, 6/4, 6/10
[51] Int. Cl. ........................A01k 47/00, A01k 47/06
[58] Field of Search................................6/1, 2, 4, 10

[56] References Cited
UNITED STATES PATENTS
| | | | |
|---|---|---|---|
| 81,220 | 8/1868 | Simons | 6/1 |
| 1,135,623 | 4/1915 | Rosato | 6/2 R |
| 3,110,044 | 11/1963 | Dullas | 6/1 |

FOREIGN PATENTS OR APPLICATIONS
| | | | |
|---|---|---|---|
| 657,715 | 1/1929 | France | 6/4 R |
| 901,380 | 11/1944 | France | 6/4 R |
| 913,565 | 6/1946 | France | 6/2 R |
| 145,240 | 5/1954 | Sweden | 6/4 R |

*Primary Examiner*—Lucie H. Laudenslager
*Attorney*—Abraham A. Saffitz

[57] ABSTRACT

A beehive having a brood frame which has a contour corresponding to the shape of a catenary. Rotatable means in the wall of the frame permit only certain bees, no bees or all bees access into the frame.

2 Claims, 2 Drawing Figures

PATENTED DEC 5 1972

3,704,471

BEEHIVES

This invention relates to beehives.

Conventional beehives usually include a main compartment or brood box of rectangular shape upon which may be superimposed on or more tiers of correspondingly shaped detachable smaller compartments known as supers.

Both brood box and supers are adapted to accommodate detachable rectangular frames for containing wax combs, the main compartment being for the bees and their rearing activities and the supers for storage of honey mostly for extraction by beekeepers.

The aforesaid parts are protected by an appropriate roof.

It is an object of the present invention to provide a beehive with a brood box of modified base which, it is believed, will enhance the efficiency of the beehive.

According to the present invention a beehive has a brood chamber of which the internal contour in sectional vertical elevation has the shape of a catenary curve which corresponds to the natural shape of the comb of the honeybee.

Preferably, the brood chamber of the hive is defined by a pair of spaced end walls and an intervening wall of constant cross-sectional shape corresponding to the natural catenary curve of natural honeycomb. There is a bee entrance opening into the brood chamber to enable bees to pass into and out of the brood chamber.

Preferably the opening has grids therein having different sized apertures thereon, and there is an adjustable plate which can cover any one or more of such grids when desired.

An embodiment of the invention will now be described by way of example only, with reference to the accompanying drawings, wherein.

Figure 1:
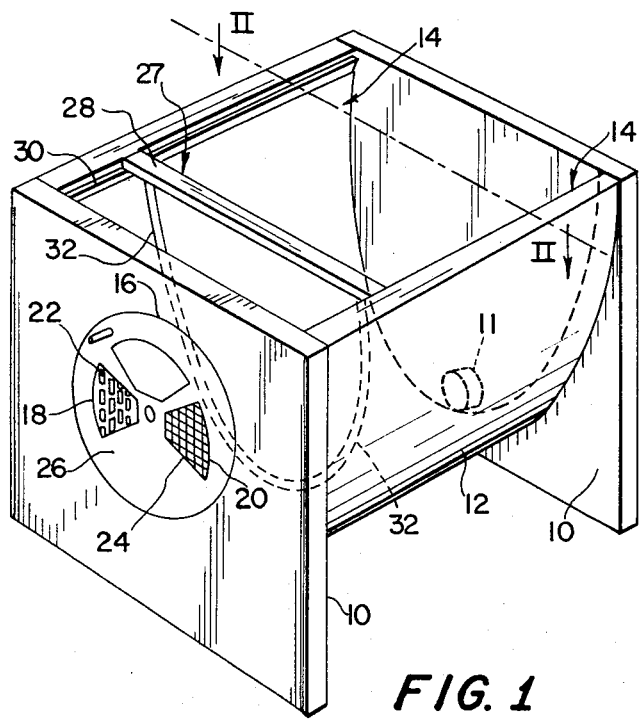
FIG. 1 is a perspective view of a beehive according to the invention.
Figure 2:
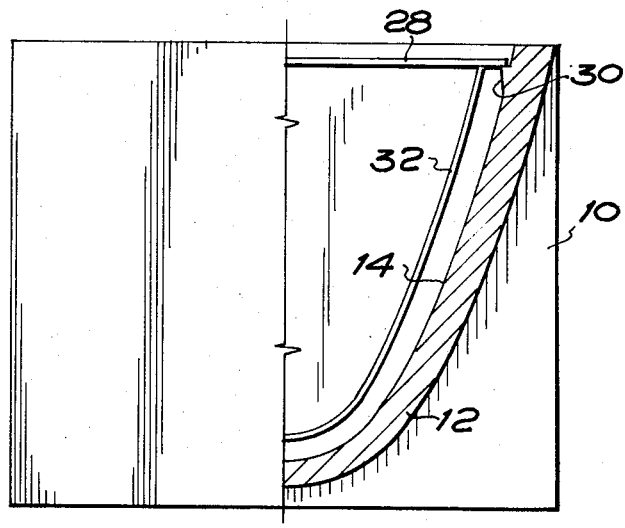
FIG. 2 is a half section elevation taken on line II—II of FIG. 1.

Referring to the drawings the brood chamber of a beehive is defined by a pair of rectangular end walls 10 which are interconnected by an intervening wall 12 of which the internal contour 14 (see FIG. 2 in particular) in sectional elevation has the shape of the catenary which corresponds to the natural shape of the comb of the honeybee.

The hive has a bee entrance opening indicated by 16 to enable bees to pass into and out of the brood chamber. The opening 16 has therein two grids 18, 20 having apertures 22, 24 respectively of different size. A disc 26 is positioned over the opening 16 and is rotatably adjustable to allow access to the brood chamber only through one 18 of said grids or to allow only ventilation of the brood chamber through grid 20 depending upon the particular time of the bee cycle. By this arrangement certain types of bees are prevented from entering or leaving the brood chamber. The entrance opening 16 is shown located near the top of one of the end walls 10, but it will be understood that such location is not necessary and the opening could conveniently be in the wall 12. At the lower end of one of the walls 10 there is located an aperture 11 which on the one hand serves the purpose of ventilating the brood chamber and on the other hand serves for enabling an Apidictor (Registered Trade Mark) to be connected to the brood chamber.

The hive illustrated may be composed of any suitable synthetic plastics substance or it may consist of a combination of such substances and wood, fiber board or laminates. It is preferred, however, that the hive be composed of light-weight plastics material such as expanded polystyrene or polyurethane rigid foam so that it is easy to handle and highly insulative. Heat insulative hives are desirable as heat losses from the hives are reduced and when this happens, it has been shown that less food is consumed by the bees.

Adapted for use with the brood chamber are brood frames for wax comb. One such frame 25 is shown in the drawings and it will be seen that each frame is shaped or contoured to correspond to the catenary curve 14 of the wall 12 of the chamber, and it has a top bar 28 which rests on shelf ribs 30 on the inner face of wall 12. Extending down from each end of bar 28 is a curved support leg 22 which corresponds in shape to the catenary curve 14. The supports serve to hold a wax foundation for the comb to be formed thereon. This support leg 32 is easily fitted but may require trimming after fitting to the support legs 32. The top bar 28 is designed such that when the chamber is full of brood frames, the top bars abut side-by-side and the spacing between the frames in the chamber is the desired amount. These frames 25 may be of moulded synthetic plastics or other suitable material or combination of such materials.

The hive may have any number of detachable supers in conjunction with the aforesaid brood chamber which supers are preferably designed to accommodate comb frames of orthodox rectangular shape. The dimensions of the top peripheral edge of the brood chamber are preferably such that the supers may be formed by either the wooden brood boxes or supers of National and Modified National hives. Of course the supers could be of synthetic plastic material having good insulative properties.

The embodiment herein described provides a beehive which does not require the usual separate floorboard, so that labor is saved in the building of the hive and in developing a colony of bees in the hive, the bees have a minimum amount of comb to build. This is to say, there are no bottom corners of comb in which to build as has hitherto been the case with rectangular frames.

I claim:

1. A beehive including a brood chamber, said hive having a pair of spaced rectangular end walls, an intervening wall interconnecting the end walls, said intervening wall being in the shape of a catenary curve extending from the tops of said end walls to adjacent the lower edge of said rectangular walls, said intervening wall having adjacent its top edges shelf ribs for supporting broad frames thereon, one of said end walls being provided with a central bee entrance opening therethrough near the top thereof, a plurality of sections two of which are grid sections, a blocking section and an open section, a disc rotatably over said opening cooperating with said bee entrance opening so the bees may pass through freely, certain types of bees may be allowed to pass through, ventilation only may be allowed or the hive be closed entirely, the other of said end walls being provided with an opening at the lower portion thereof, opening into said broad chamber to provide ventilation in said chamber.

2. A beehive as claimed in claim 1 wherein said walls are formed from heat insulating material.

* * * * *